(12) United States Patent
Trottier et al.

(10) Patent No.: US 8,731,725 B2
(45) Date of Patent: May 20, 2014

(54) TRUCK COMPARTMENT VERIFICATION SYSTEM WITH ALTERNATE TRUCK ID

(75) Inventors: Robert R. Trottier, Andover, MA (US); Kenneth L. Langlais, Andover, MA (US)

(73) Assignee: Scully Signal Company, Wilmington, MA (US)

( * ) Notice: Subject to any disclaimer, the term of this patent is extended or adjusted under 35 U.S.C. 154(b) by 952 days.

(21) Appl. No.: 12/575,934

(22) Filed: Oct. 8, 2009

(65) Prior Publication Data

US 2010/0185334 A1 Jul. 22, 2010

Related U.S. Application Data

(60) Provisional application No. 61/145,253, filed on Jan. 16, 2009.

(51) Int. Cl.
| | |
|---|---|
| *G05D 9/00* | (2006.01) |
| *G05D 7/00* | (2006.01) |
| *G05D 11/00* | (2006.01) |
| *B65B 1/30* | (2006.01) |
| *B65B 31/00* | (2006.01) |
| *B65B 1/04* | (2006.01) |
| *G01N 15/06* | (2006.01) |
| *F16K 21/18* | (2006.01) |
| *G01F 23/00* | (2006.01) |

(52) U.S. Cl.
USPC ............... 700/281; 700/282; 141/95; 141/98; 250/573; 137/386; 137/392; 73/293

(58) Field of Classification Search
CPC ....... G01F 1/363; G01F 13/006; G01F 23/02; F16K 37/0075; B67D 1/1238; B67D 7/362; F01M 11/0458; G01N 21/534
USPC ............... 700/281, 282; 141/95, 98; 250/573; 137/386, 392; 73/293
See application file for complete search history.

(56) References Cited

U.S. PATENT DOCUMENTS

| | | | |
|---|---|---|---|
| 3,882,887 A | 5/1975 | Rekai | |
| 4,147,619 A * | 4/1979 | Wassmer et al. | 209/565 |
| 4,179,623 A * | 12/1979 | Jacobsen | 250/573 |
| 4,780,705 A * | 10/1988 | Beane | 340/620 |

(Continued)

FOREIGN PATENT DOCUMENTS

EP    0 629 844 A1    12/1994

*Primary Examiner* — Kavita Padmanabhan
*Assistant Examiner* — Jason Lin
(74) *Attorney, Agent, or Firm* — Preti Flaherty Beliveau & Pachios LLP; Paul D. Sorkin

(57) ABSTRACT

A fluid overfill detection and control system for controlling the transfer of fluid into a transport vehicle having multiple fluid compartments includes a plurality of overfill sensors that are connected in series with one another and that each produces an output pulse when the fluid level in its associated compartment is below a threshold level. A diagnostic line connected to each of the overfill sensors provides a diagnostic signal indicative of the number of overfill sensors that generate an output pulse, while a module on the vehicle provides an indication of the total number of overfill sensors located in the vehicle. To prevent a hazard due to the possible bypass of a overfill sensor, the controller compares the overfill sensor count signal to the diagnostic signal and inhibits the transfer of fluid into the vehicle if the values do not match.

22 Claims, 11 Drawing Sheets

(56) References Cited

U.S. PATENT DOCUMENTS

| | | | |
|---|---|---|---|
| 5,148,378 A * | 9/1992 | Shibayama et al. | 702/116 |
| 5,515,890 A * | 5/1996 | Koeninger | 141/94 |
| 5,534,856 A * | 7/1996 | Cadman | 340/5.31 |
| 5,927,350 A * | 7/1999 | Kissinger, Jr. | 141/198 |
| 5,966,311 A | 10/1999 | Stemporzewski, Jr. et al. | |
| 6,848,481 B1 * | 2/2005 | Bay et al. | 141/65 |
| 6,904,783 B2 * | 6/2005 | Elenich et al. | 73/1.73 |
| 7,012,536 B2 * | 3/2006 | McConnel et al. | 340/618 |
| 7,254,518 B2 * | 8/2007 | Eryurek et al. | 702/183 |
| 7,403,839 B1 * | 7/2008 | Kaplan | 700/282 |
| 2002/0188382 A1 * | 12/2002 | Sherwood | 700/282 |
| 2009/0314384 A1 * | 12/2009 | Brakefield et al. | 141/67 |
| 2010/0089486 A1 * | 4/2010 | Koeninger et al. | 141/2 |

* cited by examiner

| Number dry sensors | Voltage |
|---|---|
| 0 | 12 |
| 1 | 9.91 |
| 2 | 8.44 |
| 3 | 7.35 |
| 4 | 6.51 |
| 5 | 5.85 |
| 6 | 5.3 |
| 7 | 4.85 |
| 8 | 4.47 |
| 9 | 4.15 |
| 10 | 3.86 |
| 11 | 3.61 |
| 12 | 3.4 |
| 13 | 3.21 |
| 14 | 3.04 |
| 15 | 2.89 |
| 16 | 2.75 |

| Reserved For Use By Rack System Manufacturer |
|---|
| 802 |
| Reserved For Use By Vendor 1 |
| 804 |
| Reserved For Use By Vendor 2 |
| 806 |
| Reserved For Use By Vehicle Manufacturer |
| 808 |

← 808

| Definition |
|---|
| Write command will initialize the Vehicle Table |
| Reads Vehicle Builder Table Valid. |
| Revision of this table |
| The stored Vehicle Tester T.I.M. is valid |
| Where the Vehicle Tester T.I.M. is stored |
| The stored Alternate T.I.M. is valid |
| Where the Alternate T.I.M. is stored |
| Vehicle Builder's name |
| Vehicle Builder's address |
| Serial Number |
| Vehicle VIN number |
| Build date DD/MM/YYYY |
| Gross Vehicle Weight rating units 1 - pounds, 2 - Kilograms |
| Gross Vehicle Weight rating |
| IntelliCheck present<br> 0 - none, 1 - Version 1, 2 - Version 2, 3 - Version 3 |
| Sensor Type:<br> 1 - Thermistor, 2 - 2 Wire Optical, 3 - Wire Optical |
| Number of Vehicle compartments |
| Compartment volume 1 - Gallons, 2 - Imperial Gallons, 3 - Liters |
| The volume of compartment 1 |
| The volume of compartment 2 |
| The volume of compartment 3 |
| The volume of compartment 4 |
| The volume of compartment 5 |
| The volume of compartment 6 |
| The volume of compartment 7 |
| The volume of compartment 8 |
| The volume of compartment 9 |
| The volume of compartment 10 |
| The volume of compartment 11 |
| The volume of compartment 12 |
| The volume of compartment 13 |
| The volume of compartment 14 |
| The volume of compartment 15 |
| The volume of compartment 16 |

*FIG. 9*

TRUCK COMPARTMENT VERIFICATION SYSTEM WITH ALTERNATE TRUCK ID

FIELD OF THE INVENTION

The present invention relates to fluid overfill detectors and control systems in fluid transportation vehicles. In particular, embodiments of this invention relate to the field of flammable fluid transfers in transportation vehicles.

BACKGROUND OF THE INVENTION

Controlling the safe and proper transfer of flammable fluids when loading transportation vehicles such as tanker trucks has long been a concern in the petroleum industry. In recent years, safety devices have been implemented on tanker trucks that prevent fluid transfer from a loading terminal to the truck if certain unsafe conditions surrounding the transfer exist. These devices use detection equipment to determine if all of the safety precautions have been taken and prevent fluid flow if they have not. The prevention of fluid flow is controlled electrically, by closing a valve in a fluid transfer conduit, or by disabling a pump that is responsible for transferring the fluid to the tanker.

Presented in FIG. 1a is a schematic representation of a tanker truck 100 that has multiple fluid containment compartments 102. The number of compartments can vary from one tanker truck to another. In the United States, tanker trucks typically have four to five compartments, and in Europe, tanker trucks can have up to sixteen compartments. Consequently, each compartment 102 can be filled with a different type of fluid; this provides for the transit of a variety of fluid types in a single truckload. Each compartment can have a total volume that differs from one another. Moreover, each compartment can have some remaining fluid, the amount of which can differ from one compartment to another. As a result, the amount of fluid required for filling each compartment 102 can be different.

To prevent overfilling of the compartments 102, an overfill sensor 104 is located in each compartment. In general, the sensor is located near the top of the compartment to detect if the fluid has reached a certain threshold level. The threshold level can depend on the size of the compartment or on the specific type of fluid that is being transferred into the compartment. The sensor 104 of each compartment 102 is connected to a connection socket 106 by which the truck is connected to a controller 108 that is located at the pumping site. The controller 108 receives signals from various sensors on the truck and stops the filling of the tanker truck 100 when a hazardous condition is detected, such as when one of the overfill sensors indicates that the fluid in its compartment has reached the threshold level.

There are several types of sensors and various ways of connecting the sensors 104 to the connection socket 106 of the controller 108. For example, one sensor type has two wires whereby the sensors can each be independently connected to the connection socket. This provides a simple way for the controller to monitor the sensors since, when a sensor detects an overfill condition, the controller can easily detect which sensor has been triggered and, therefore, which compartment is full. However, since each sensor is independently connected to the connection socket, a sufficient number of available pins are required on the connection socket for connecting the sensors all at once. This can be particularly problematic for trucks having a large amount of compartments and thereby requiring a large amount of sensors to be connected, since the number of pins provided on a standard connection socket may not be sufficient.

In another example, an alternate sensor type has a connector with five wires whereby the overfill sensors are connected together in series in a "daisy chain." That is, a detection signal from a first sensor is passed to a subsequent sensor and so on to the end of the sensor chain, the detection signal from the last sensor being returned to the controller. If there is an overfill condition in any one of the compartments, the sensor for that compartment will not output the detection signal, the chain is broken and the controller does not receive the detection signal. The absence of a detection signal at the output of the daisy chain thereby indicates to the controller the presence of an overfill condition in one of the compartments. Irrespective of the number of sensors connected to the controller, the number of pins required by the daisy chained sensors on the connection socket is always the same, so the number of truck compartments that may be monitored is not limited by the socket. However, the monitoring process of the controller is more complex, since it is difficult to identify which of the daisy chained sensors is detecting an overfill condition. Moreover, unlike with the two wire sensor, malfunctioning sensors can very easily be bypassed, leaving the compartment of the sensor unprotected from possible overfills.

Sensors 104 of each compartment 102 that are daisy chained together are connected so that the output of one sensor is the input of the next sensor. A pulse generator on the controller on the loading terminal sends a pulse to the input of the first sensor 104 and the controller 106 looks for a pulse return at the output of the last sensor 104. If the return pulse is detected, the controller 106 determines that all sensors are connected and that none of the compartments are overfilled. However, if there is no return pulse detected, the controller 106 determines that either at least one sensor is disconnected or that, in at least one compartment, the fluid has reached its overfill level, and therefore terminates the filling process for all compartments.

One problem with sensors connected in series is that a malfunctioning sensor can easily be bypassed without the controller detecting the bypass. Presented in FIG. 1b is a schematic illustration of three sensors 104 that are daisy chained together, the pulse output 206 of a sensor being connected to the pulse input 204 of the next sensor. It is possible to bypass a malfunctioning sensor 110 by connecting the pulse output of the previous sensor to the pulse input of the next sensor, such as illustrated in FIG. 1c. Since the bypassed sensor no longer has an effect on the propagation of the detection pulse, there is a possibility for the filling operations to continue, causing an overfill and spill. This creates a potentially dangerous situation, where spillage of fluids such as hazardous or flammable fluids can cause fatal accidents.

It is also known to provide a second checking mechanism that uses a Truck Identification Module (TIM) to assign a unique serial number to a vehicle. The TIM, once attached to a specific vehicle, associates a unique ID, i.e., a Truck ID (TID) that can be read by several different systems. The TID is used for several purposes by the terminal automation system and rack controller.

As known, the TIM and associated TID can be used to validate a vehicle's authorization to load in an unmanned terminal. In such a system, the rack equipment (or terminal automation system) maintains a list of authorized trucks, by TID, that are approved to load at that loading bay (Rack). If an unauthorized vehicle attempts to load, the system denies loading and records the attempt for logging or data collection purposes.

In addition, the TID can be used for verifying fuel type access. Here, a loading Rack checks an incoming vehicle's TID to validate that the fuel they are attempting to load is approved for that vehicle. Where a loading facility often has multiple loading racks, one might be for dispensing diesel fuel, another for gasoline and yet another for aviation fuel as found at a military base or airport. The use of the TID for fuel verification prevents a vehicle from taking on the wrong fuel type Currently, the fact that every TID is unique requires that every time a vehicle, i.e., a truck, is added to, or transferred out of, a fleet of vehicles, the TID must be entered or deleted from every rack controller that the vehicle might visit. In many instances, this involves a field visit to the rack where the TID has to be manually entered into the controller. In large and dynamic fleets this reprogramming of racks becomes burdensome. For example, in the case of military bases, a vehicle may change bases and or fuel types frequently. Such reallocation necessitates the reprogramming of controllers to delete or add new TIDs from the racks—a costly and inefficient process.

SUMMARY OF THE INVENTION

A diagnostic line that is connected to each of the sensors is also included in the system. The diagnostic line provides a diagnostic signal input to the controller and provides an indication of the number of sensors that generate an output pulse. The diagnostic signal may be based on a voltage that is at least partially formed by a set of parallel circuit paths, each created by a different sensor when that sensor generates an output pulse. Thus, the voltage is indicative of the number of "active" sensors. A lookup table module is accessed by the controller for correlating the detected diagnostic voltage to a value indicative of a number of active sensors. For example, the lookup table module may be stored in the controller and accessed by the controller for correlating the detected diagnostic voltage to a value indicative of a number of active sensors. According to one embodiment of this invention, the diagnostic line may be active at all times and when all sensors are dry can be used to determine the total number of non-bypassed sensors.

A sensor count signal source such as a Compartment Count Module (CCM), typically located on the transport vehicle, provides a sensor count signal to the controller that indicates the total number of sensors located in the vehicle. The controller, upon connection, reads the number of sensors on the vehicle from the CCM, compares the number of sensors indicated by the sensor count signal to the number of sensors indicated by the diagnostic signal input and determines whether those numbers match. When there is no match, the controller inhibits the transfer of fluid into the vehicle.

A compartment capacity signal source may also be located on the truck and may be part of the CCM. The compartment capacity signal source, for each compartment of the transport vehicle, provides a capacity value indicative of a total maximum fluid capacity. This value may be used by the controller in conjunction with external components, such as one or more load meters and associated fluid pumps, for regulating the amount of fluid transferred to a compartment. Similarly, a compartment fuel type signal source may also be located on the truck and may be part of the CCM. The compartment fuel type signal source generates a fuel type identifier for each compartment that may be used by the controller and an external system to ensure that the fuel type transferred into a compartment corresponds to the fuel type intended for that compartment.

BRIEF DESCRIPTION OF THE DRAWINGS

For a better understanding of embodiments of the present invention described herein, and to show more clearly how they may be carried into effect, reference will be made by way of example, to the accompanying drawings in which:

FIG. 9 is a breakdown of one section of the memory of FIG. 8;

DETAILED DESCRIPTION OF THE INVENTION

This application claims priority from, and incorporates by reference for all purposes, the entirety of, U.S. Provisional Application No. 61/145,253, entitled "Fluid Overfill Detection and Control System With Sensor Count Verification" and which was filed Jan. 16, 2009.

Figure 1A:
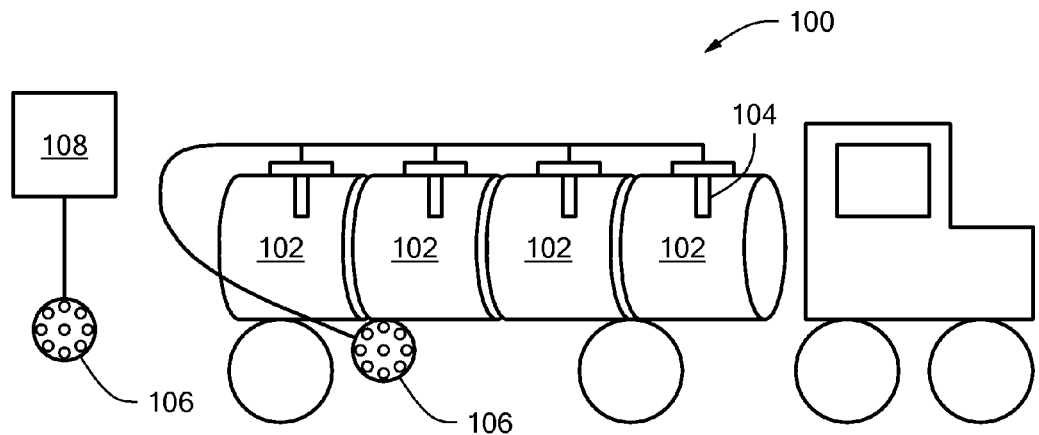
FIG. 1a is a schematic representation of an overfill detection and control system as is known in the prior art.
Figure 1B:
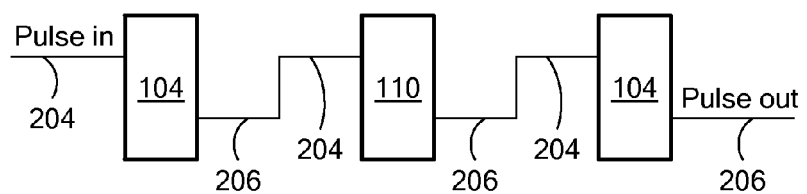
FIG. 1b is a schematic illustration of three sensors that are daisy chained together as is known in the prior art.
Figure 1C:
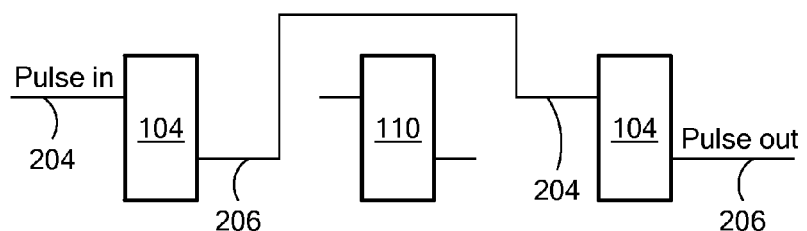
FIG. 1c is a schematic illustration of multiple sensors that are daisy chained together with one sensor having been bypassed, as is known in the prior art.

Embodiments of the present invention relate to an overfill detection and control system that uses sensors 104 such as those shown in FIG. 1a. The sensors 104 each have a conical prism which receives light from a light emitting diode (LED). When activated, the LED emits a light beam into the prism towards an interface between the prism and the external environment. The angle of the interface is such that, when the prism is in contact with air (i.e., sensor is "dry"), the light beam is internally reflected within the prism due to the difference in the refractive index of the air and the prism material, and is directed toward a phototransistor. The phototransistor generates an electrical pulse in response to a received light signal, and the electrical pulse triggers the generation of a pulse on the sensor output line. Alternatively, when the prism is in contact with a fluid, i.e., sensor is "wet," due to the similar refractive index of the fluid and the prism material, the light beam passes through the prism/fluid interface and into the fluid. As a result, the light beam does not reach the phototransistor and no electrical pulse is generated and, therefore, there is no pulse at the output of the sensor.

Figure 2:
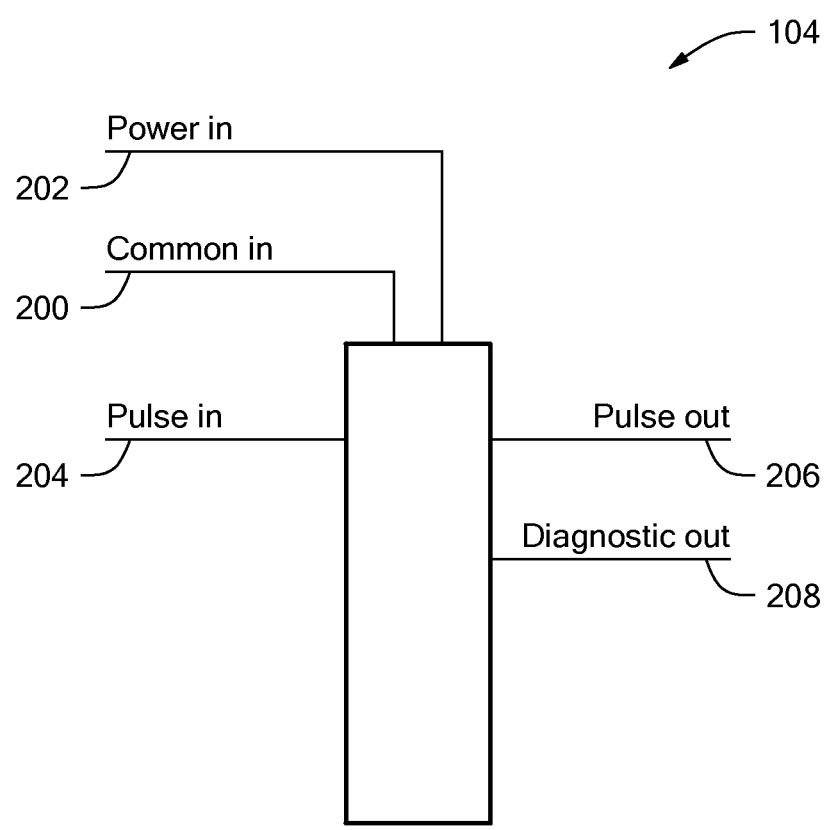
FIG. 2 is a schematic representation of a sensor used in the overfill detection and control system of one embodiment of the present invention.

As shown in FIG. 2, a sensor 104 has a ground 200 and a power line 202 for powering the electrical components of the sensor. The sensor also has a pulse input 204 and a pulse output 206 for propagating a pulse when the sensor is "dry." That is, when the sensor is "dry," a pulse on the sensor pulse input 204 results in the generation of a pulse on the sensor pulse output 206. In contrast, if the sensor is "wet," no pulse is generated on the sensor pulse output in response to an input pulse. The pulse output line 206 may be connected to the pulse input line of another sensor. In this way, each sensor operates as one link in a pulse "chain," propagating a pulse from one sensor to the next as long as no wet sensor is encountered. The sensor also has a diagnostic output 208 that is used for collecting information related to each sensor.

Figure 3:
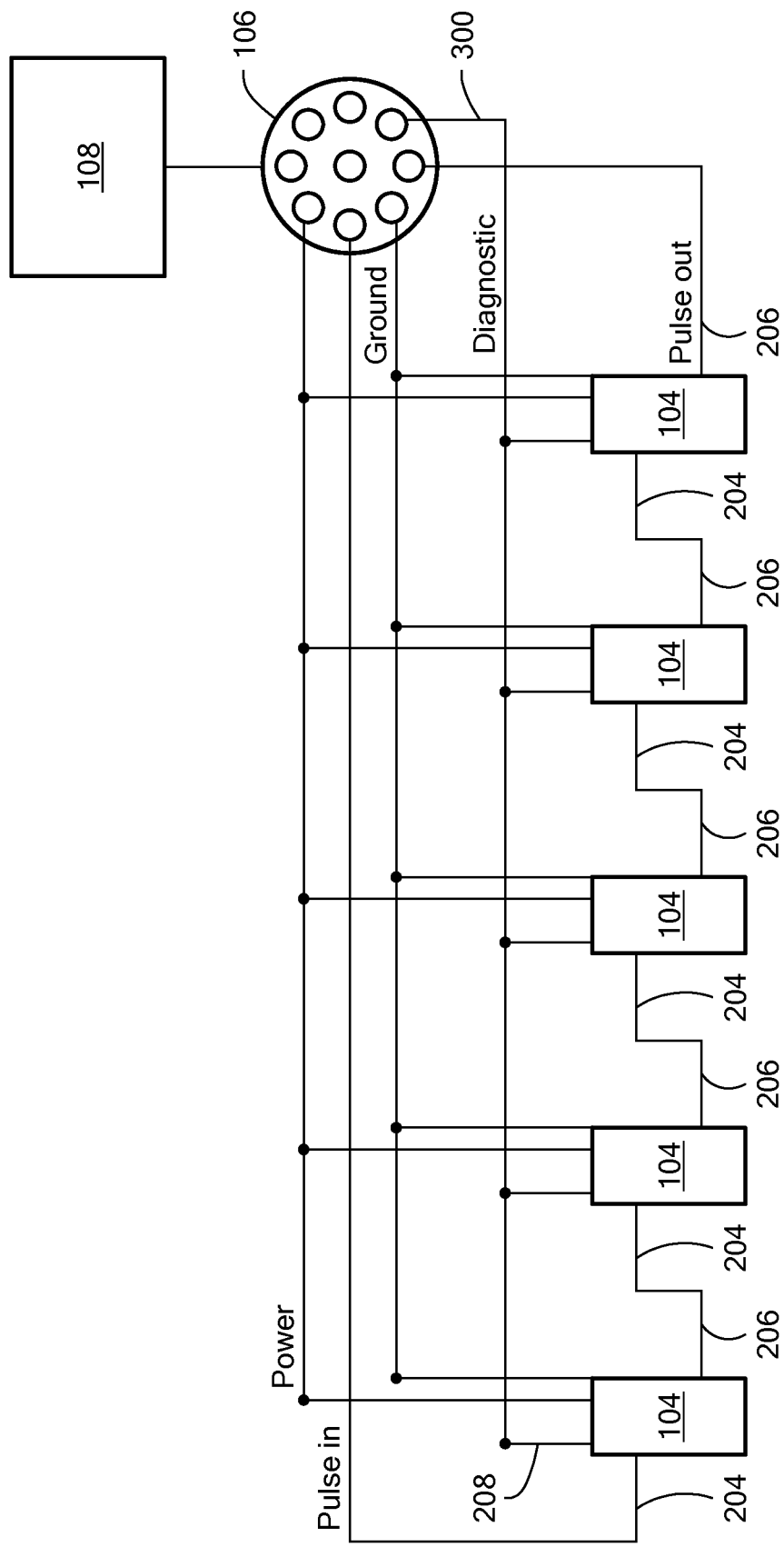
FIG. 3 is a schematic diagram of multiple sensors of one embodiment of the present invention that are connected to a connection socket of a controller.

Presented in FIG. 3 is a schematic diagram of a series of five sensors 104 that are connected to the connection socket 106 of the truck, by which the truck may be connected to a controller 108 located at a loading terminal. The sensors are daisy chained together whereby the pulse output 206 of one sensor is connected to the pulse input 204 of the next sensor. According to this embodiment, the pulse input of the first sensor is connected to a first pin of the connection socket and the pulse output of the last sensor is connected to a second pin of the connection socket. The controller sends an electrical pulse to the pulse input of the first sensor and monitors whether or not the electrical pulse is propagated to the pulse output of the last sensor. When the controller detects an electrical pulse at the output of the last sensor, the controller determines that all the sensors are "dry." However, as there may be a sensor that has been bypassed, the controller also monitors a diagnostic line 300 connected to a diagnostic output 208 of each sensor.

Figure 4:
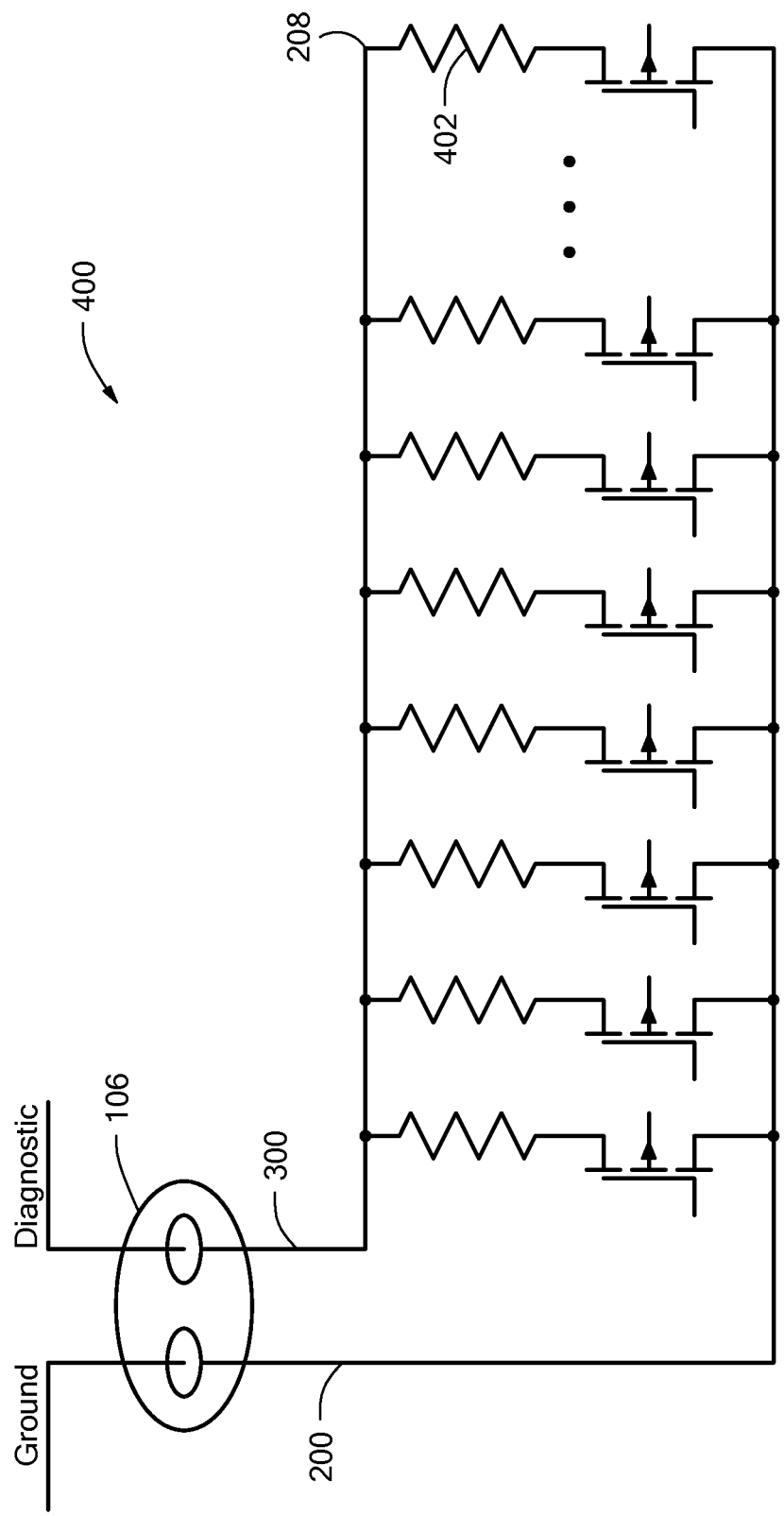
FIG. 4 is an electrical diagram showing the effective arrangement of parallel current paths formed by sensors connected to a diagnostic line.

As shown in FIG. 3, a diagnostic line 300 is connected to a third pin of the connection socket 106. On the diagnostic line, there is connected the diagnostic output 208 of each sensor 104. Each sensor circuitry is arranged so as to add a parallel current path to the diagnostic output when the sensor is "dry." Presented in FIG. 4 is an electrical diagram 400 showing the effective arrangement of parallel current paths formed by the sensors connected to the diagnostic line 300. A resistance 402 of each sensor diagnostic output is connected at one end to ground 200 via a transistor, and at the other end to the diagnostic line 300. When the sensor is "dry," the corresponding transistor for the diagnostic output is activated in response to the electrical pulse generated by the phototransistor. The activated transistor for the diagnostic output allows current flow between the diagnostic line 300 and ground 200. Thus, for each sensor that is "dry," a parallel current path is formed which is limited by a resistance located in that path. As such, the greater the number of parallel current paths connected to the diagnostic line, the lower a diagnostic line voltage. Consequently, when all the sensors are "dry," the voltage on the diagnostic line 300 is at its minimum.

Alternatively, when a sensor is "wet," no phototransistor output is generated, and the transistor for that sensor's diagnostic output is not activated. As a result, the parallel current path to the diagnostic output is not connected to the diagnostic line 300 and has no influence on the diagnostic line voltage of the diagnostic line 300. Assuming that no sensor has been bypassed, the voltage level on the diagnostic line 300 is indicative of which of the sensors is the first "wet" sensor. Since the pulse propagation is stopped by the first "wet" sensor, and the following sensors in the chain do not get triggered, no parallel current paths are formed by any of the sensors in the daisy chain that follow the first "wet" sensor.

In one embodiment of the present invention, each sensor is provided with two pulse generators (not shown). One pulse generator provides the output pulse that is input to the next sensor in line and the other pulse generator activates the transistor for a predetermined period of time as will be described in more detail below. As such, the voltage on the diagnostic line is affected only by the parallel circuit paths of the sensors of the chain that are positioned before the first "wet" sensor of the chain. Consequently, based on the voltage of the diagnostic line, the controller identifies the first "wet" sensor in the chain.

Figures 5A, 5B:
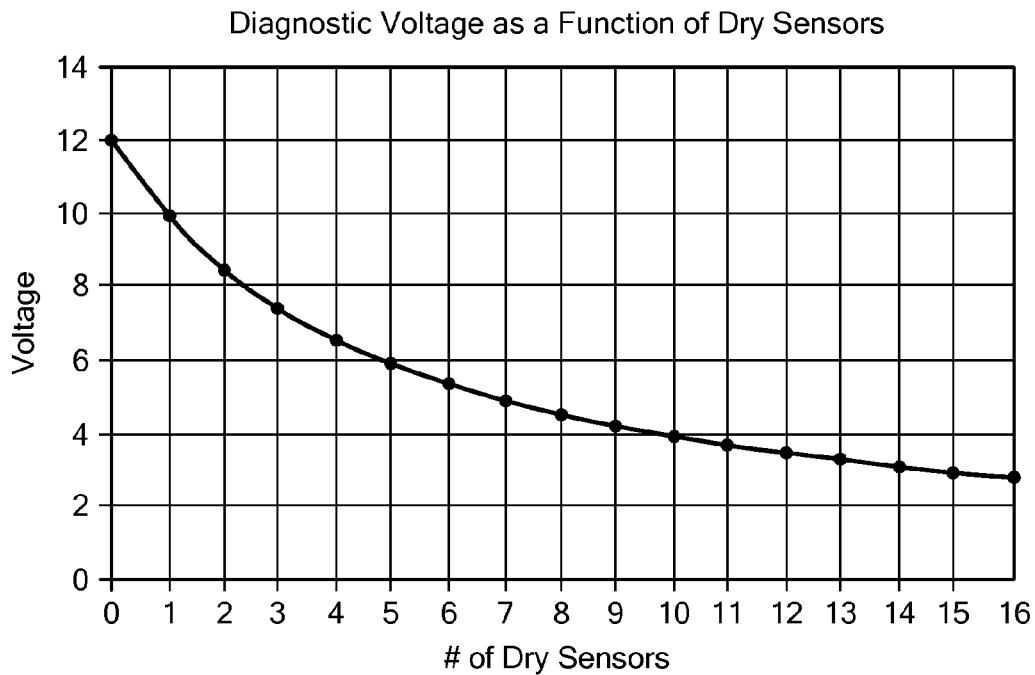
FIG. 5a is a graph of the expected voltage level according to the number of detected sensors in the overfill detection and control system.
FIG. 5b is a representation of a lookup table for determining the number of detected sensors according to a voltage level.

Presented in FIG. 5a is a graph 500 showing an example of the expected voltage level according to the number of detected sensors in the overfill control and detection system. In operation, when none of the sensors has been bypassed, the controller monitors the voltage on the diagnostic line 300 to compare it with the voltage levels of a lookup table 502, such as that presented in FIG. 5b. The lookup table 502 holds possible ranges of voltage levels expected on the diagnostic line 300 according to a number of sensors that are detectable, i.e., sensors that are connected and "dry." It will be understood by a person skilled in the art that the expected ranges of voltage levels can differ depending on the resistors, transistors and sensor circuitry that are used. Moreover, the lookup table may be specific to a manufacturer's control system and is based on the total number of sensors available for a specific tanker truck. In the exemplary embodiment, the lookup table 502 is located in a memory of the controller. In operation, when the controller fails to detect a return pulse from the sensors, the controller accesses the memory for comparing the voltage of the diagnostic line 300 to the ranges of voltage levels in the lookup table 502 for determining which sensor is "wet." Still further, a tolerance of a predetermined percentage may be applied to the measured value as compared to the values in the lookup table 502 to account for any drift or variation in the measured voltage.

In one embodiment of the present invention, each sensor is provided with an internal transistor and resistor connected to the diagnostic line. Alternately, a sensor could be provided with an output for driving an external transistor/resistor combination connected to the diagnostic line 300.

Further, one of ordinary skill in the art will understand that a relay could be used in place of the transistor. In that case, the relay and/or resistor could either be internal to the probe or externally provided and operated by an output signal from the probe.

In addition, one of ordinary skill in the art will understand that an embodiment of the present invention could be provided where the transistors or relays, depending on the implementation, are normally "on," or closed, such that the respective resistor is "pulling down" the voltage on the diagnostic line 300 absent any signal from the respective sensor. In such an embodiment, a "dry" sensor would then de-assert the transistor or "open" the relay. One of ordinary skill in the art will understand how to populate the table 502 in such an implementation. Thus, the voltage on the diagnostic line 300 will be at its highest value, as defined in the table 502, when all sensors indicate being dry.

In yet another variation, each sensor could apply a constant voltage through a resistor to a node having another resistor tied to ground. The voltage at the node would rise as more "dry" probes "add" a respective resistance in parallel. The voltage level, as a function of the number of dry sensors, would be known and stored in the table for comparison when measuring.

Figure 6:
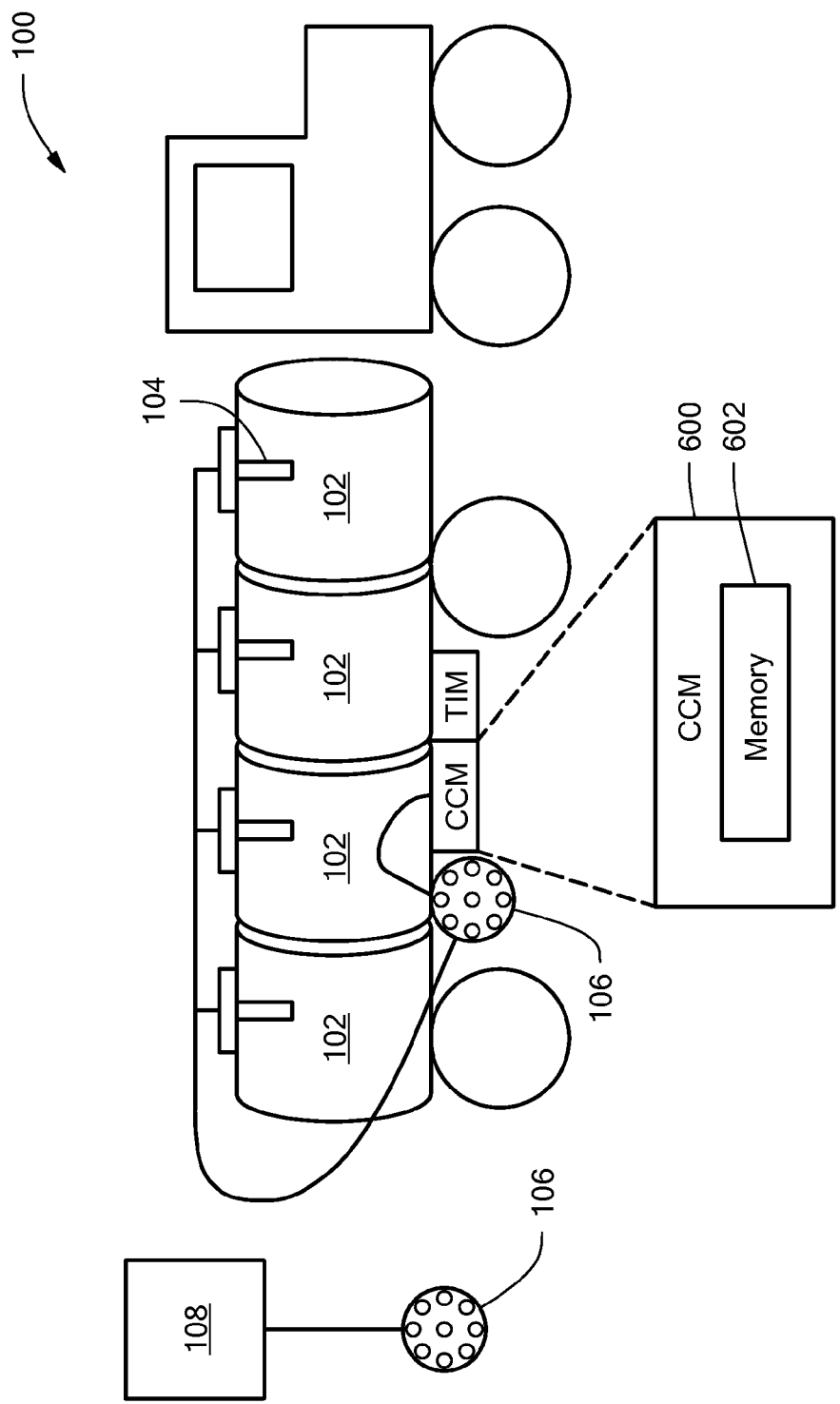
FIG. 6 is a schematic representation of an overfill detection and control system according to one embodiment of the present invention showing a Compartment Count Module used on a truck into which fluid is transferred.

Presented in FIG. 6 is an exemplary embodiment of the invention that uses a fourth pin of a connection socket 106 for connecting to a Compartment Count Module (CCM) 600 located on the truck. This module holds in a memory 602 a value representing the total number of compartments with which the tanker truck was manufactured. This value, typically programmed by the truck manufacturer, is read by the controller and used in determining whether a sensor has been bypassed. By monitoring the diagnostic line signal, when the controller detects a pulse at the output of the last sensor of the "chain," it can also determine the number of sensors that are active in the daisy chain by comparing the voltage on the diagnostic line 300 to the lookup table 502 (FIG. 5b). The number of active sensors indicated by this voltage value is then compared to the compartment count value and, if these values are equal, the controller concludes that there has been no bypassing of a sensor. Alternatively, if the number of detected sensors is not equal to the compartment count value, the controller prevents the loading of the truck due to the possible bypassing of at least one of the sensors.

In one embodiment of the present invention, the CCM is a passive storage module located on the truck. A truck may also use a similar passive storage module for truck identification information. Truck identification modules ("TIMs") such as this are known in the art, and are used for storing various data related to the truck. Depending on the available memory space of a module, it is possible for the CCM and the TIM information to be located in a single module. CCM information may also be added to an existing TIM module to allow easy retrofitting of the CCM to an existing system. In addition to storing the compartment count value, it is possible for the CCM to store other compartment related information. As an example, the CCM may store a total capacity value for each compartment. When the total capacity value for each compartment is available, a capacity monitoring system can use this value for preventing the pumping of fluid beyond the total capacity value for each compartment. It is also possible for the CCM to store a fuel type identifier for each compartment. When the fuel type identifier for each compartment is available, a fuel type monitoring system can use this identifier for preventing the pumping of fluid when the fuel type to be transferred into the compartment does not correspond to its fuel type identifier.

Figure 7:
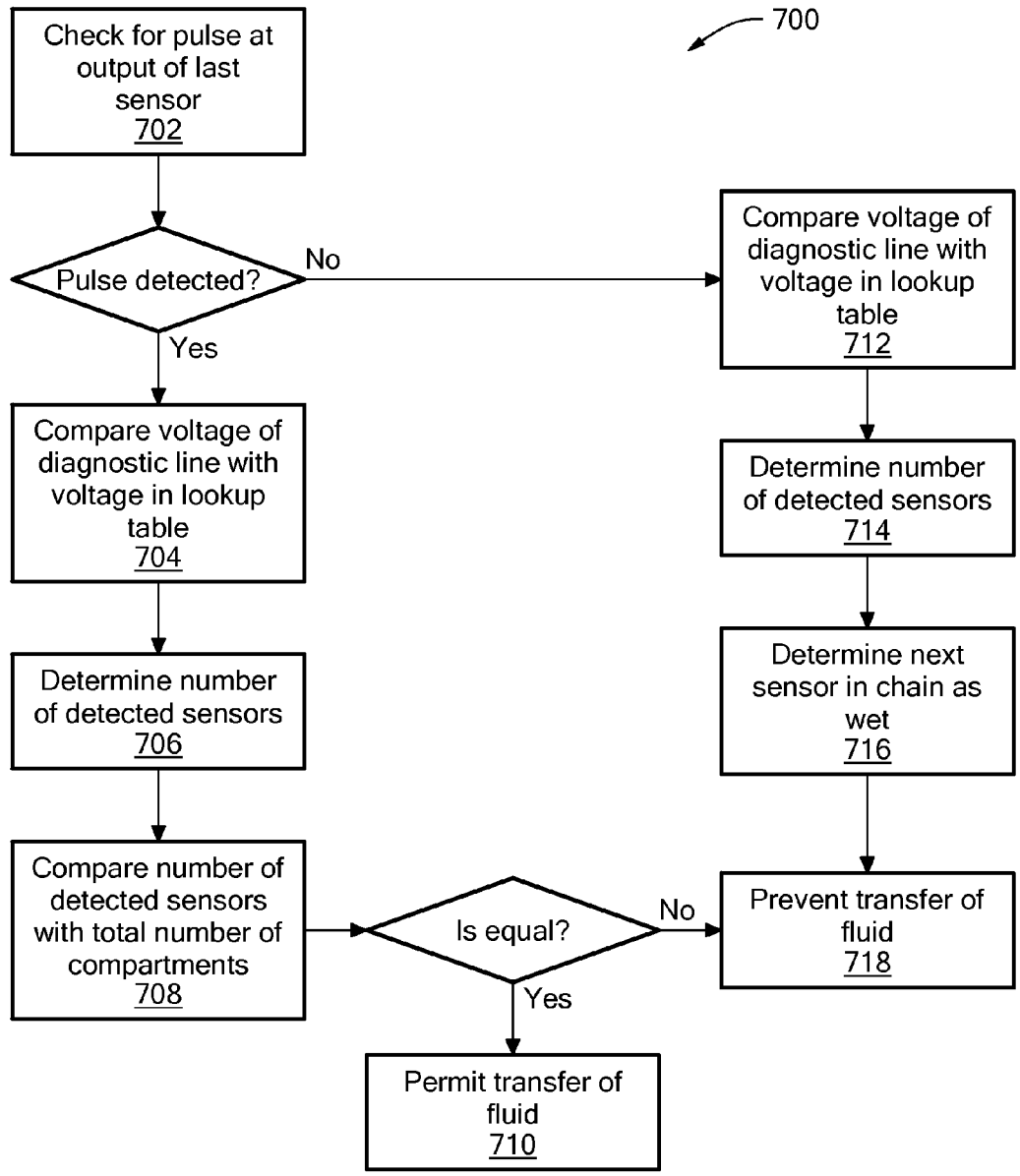
FIG. 7 is a flow diagram 700 of the steps taken by the overfill detection and control system in accordance with one embodiment of the present invention.

Presented in FIG. 7 is a flow diagram 700 of the steps taken by the detection and control system to determine if the controller should permit the transfer of fluids into the truck. First, the controller checks if there is a pulse at the output of the last sensor of the "chain" (step 702). If the controller detects the presence of an electrical pulse at the output of the last sensor, the system first verifies if all sensors are detected and none have been bypassed. For this, the system checks the voltage on the diagnostic line 300 and compares this voltage to the lookup table 502 (step 704). Then, based on the lookup table 502 and the voltage on the diagnostic line 300, the system determines the number of detected sensors (step 706). The number of detected sensors is then compared to the total number of compartments (step 708), the value of which is stored in the CCM. If the number of detected sensors is equal to the total number of compartments, the controller permits the transfer of fluid (step 710), assuming no other potentially hazardous conditions are detected (other safety conditions, such as the presence of a proper ground connection, may also be assessed by the controller, but are beyond the scope of this invention and therefore not discussed in any detail herein). If the number of detected sensors is not equal to the total number of compartments, the controller identifies this as a hazardous condition (a possible sensor bypass) and stops the transfer of fluids into the compartments (step 718).

When the controller does not detect the presence of an electrical pulse at the output of the last sensor, this is an indication that at least one sensor is "wet." The controller therefore tries to determine the first sensor in the "chain" that is "wet," i.e., the sensor that is blocking the propagation of the electrical pulse. The controller checks the voltage on the diagnostic line 300 and compares it to the voltage levels in the lookup table 502 (step 712). Based on the voltage on the diagnostic line 300 and the lookup table 502, the system determines the last sensor in the "chain" that propagated a pulse (step 714). The position of the "wet" sensor is the sensor following the last sensor in the "chain" that has propagated the input pulse. Therefore, the next sensor is identified as being the first "wet" sensor (step 716). The controller prevents the transfer of fluids into all compartments (step 718) due to the hazardous overfill condition, and retains an indication of which sensor is "wet" for diagnostic purposes.

Figure 10:
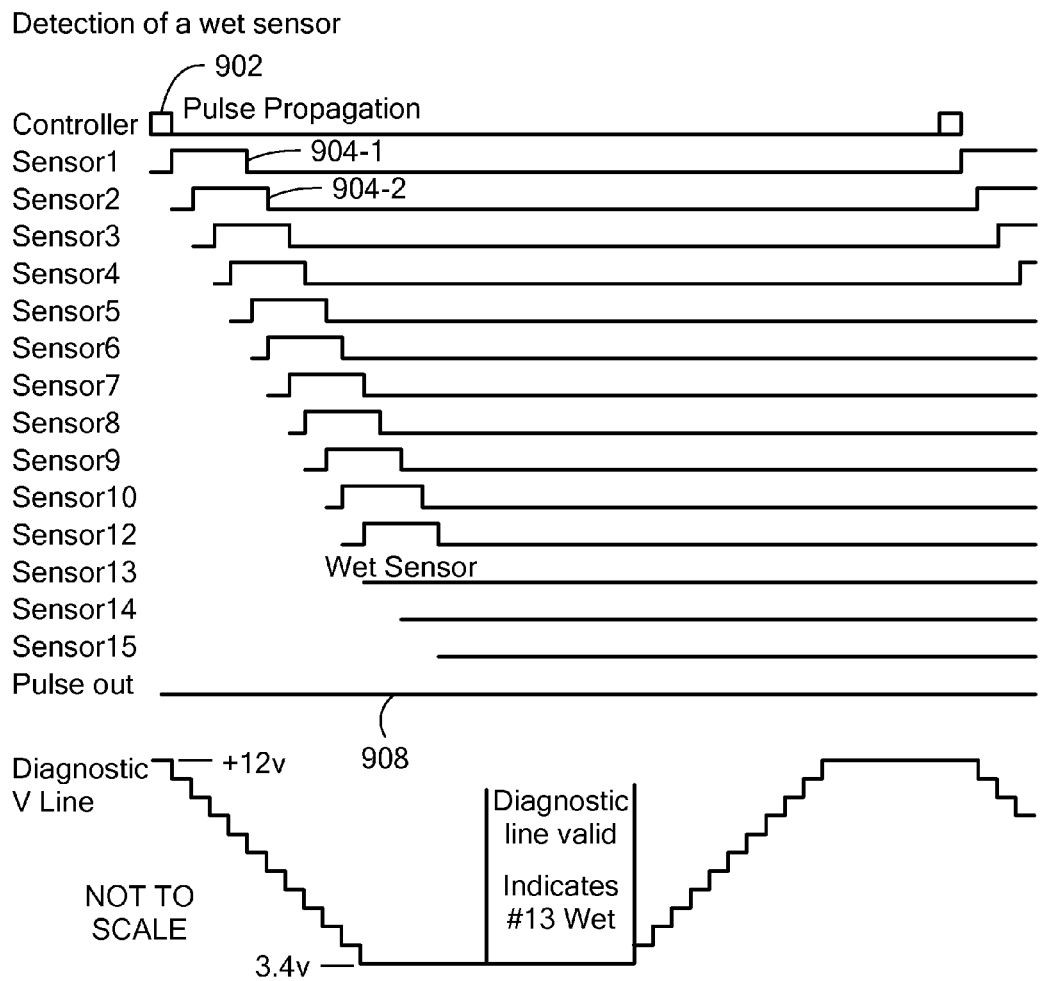
FIG. 10 is a timing chart of operation in accordance with an embodiment of the present invention where a sensor is "wet.

Referring now to FIG. 10, a timing diagram represents the pulses and voltages measured in accordance with the method shown in FIG. 7 and the equipment of FIGS. 4-6, when a sensor is "wet," i.e., is detecting an over-fill condition. As above, an input pulse 902 is generated by the rack controller and presented to the first sensor in line. Each dry sensor n produces an output pulse 904-n in response to the input pulse 902. In one embodiment, the output pulse is generated in less than 100 microseconds ($\mu$s) so a controller can send out an input pulse to a chain of, for example, 16 sensors and receive a pulse out in 1600 $\mu$s. In such an embodiment, the controller issues the input pulse 902 approximately every 3000 $\mu$s As described above, each dry sensor, upon receipt of the input pulse from the previous sensor in line, adds a resistor from the diagnostic line to ground. Each sensor holds its respective resistor in the circuit for a period longer that the propagation delay through the maximum number of sensors yet less than the rate at which the controller issues input pulses 902 which, in the present example, is about 2000 $\mu$s.

Where a sensor is "wet," the controller will determine that an output pulse on an output pulse line 908 was not detected when expected. In response to the absence of the output pulse, the controller sends another input pulse 902 and, after an appropriate delay, in the present example, about 6000 $\mu$s, reads the voltage 910 on the diagnostic line 300. As above, the voltage value on the diagnostic line 300 indicates which sensor is wet as the value on the diagnostic line 300 will indicate the "last" sensor in line that was dry.

Figure 11:
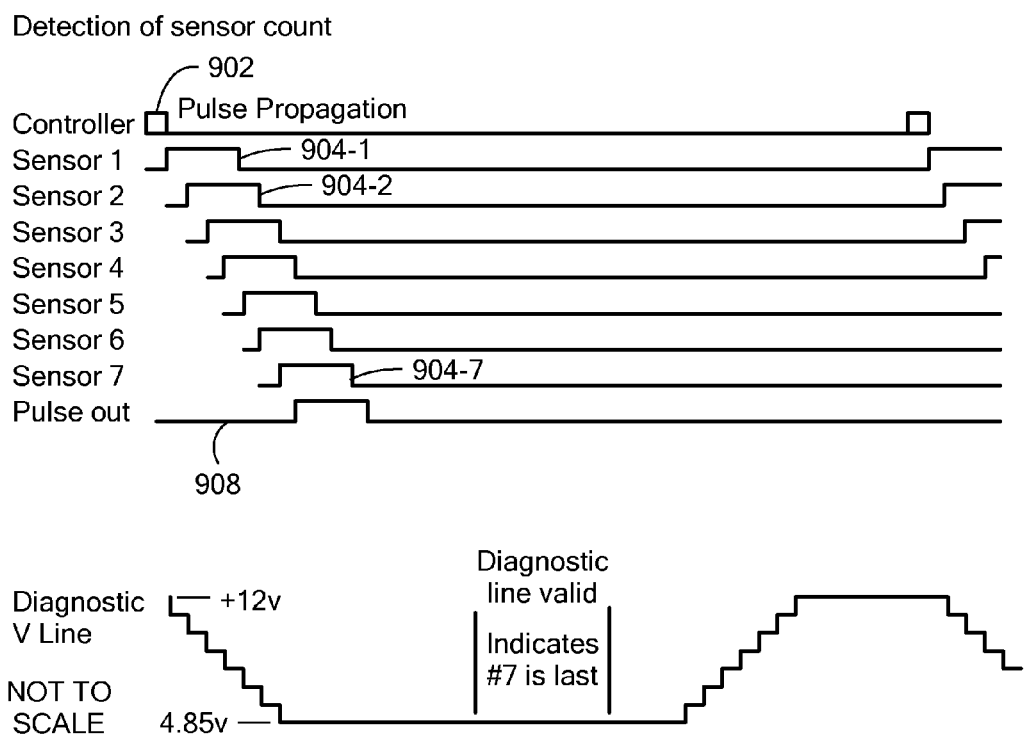
" and FIG. 11 is a timing chart of operation in accordance with an embodiment of the present invention where all sensors are "dry."

Referring now to FIG. 11, operation of an embodiment of the present invention will be described for confirming the correct number of sensors in a vehicle. The rack controller sends an input pulse 902 which is passed along by each sensor. Where all sensors are dry, the pulse is passed along from one to the next and each dry sensor couples its respective resistor to the diagnostic line 300. When the rack controller receives an output pulse of a valid width as compared to a predetermined expected width, e.g., 500 $\mu$s to 12 milliseconds, on the line 908, the rack controller measures the voltage on the diagnostic line 300. Then, using the lookup table 502, the number of dry sensors corresponding to the voltage on the diagnostic line 300 is compared to the expected number of sensors or compartments on the vehicle. If the values match, then loading of the vehicle may be authorized.

In another embodiment of the present invention, vehicles equipped with two wire monitoring systems are modified. It is known that vehicles with two wire systems will interact with a rack controller, depending on the controller's setup, that requires a vehicle to present either six or eight fillable compartments. When a vehicle has less than six or eight compartments, "dummy" sensor(s) are provided in order for a vehicle to present six or eight sensors, i.e., compartments, to a rack. The purpose of the dummy sensor(s) is to fill any sensor locations not actually using sensors.

As known in the industry, in a rack using a 2-wire system, the controller does not "know" how many sensors to look for on a vehicle. Thus, as a convention, rack controllers are configured to look for either six or eight compartments and to expect six or eight dry compartments, respectively. The "dummy" sensor is an electric device that mimics the output of a dry two-wire sensor and is added to "pad up" the number of detected sensors so that six or eight are presented to the rack controller.

Further, in a two wire sensor implementation, the vehicle manufacturer will write, into the CCM memory or the TIM, the total number of compartments, i.e., "real" compartments and the dummy sensors, in order to bring the "apparent" number of compartments up to six or eight. When the vehicle is connected to a controller, the controller checks the sensor count in the TIM and compares it to the setup for the controller. In this way, a vehicle with eight compartments will be prevented from loading at a rack with the capacity to monitor only six sensors or compartments on a vehicle. Advantageously, the risk of loading a vehicle with some of its compartments unmonitored by the rack monitoring system is avoided.

Figure 8:
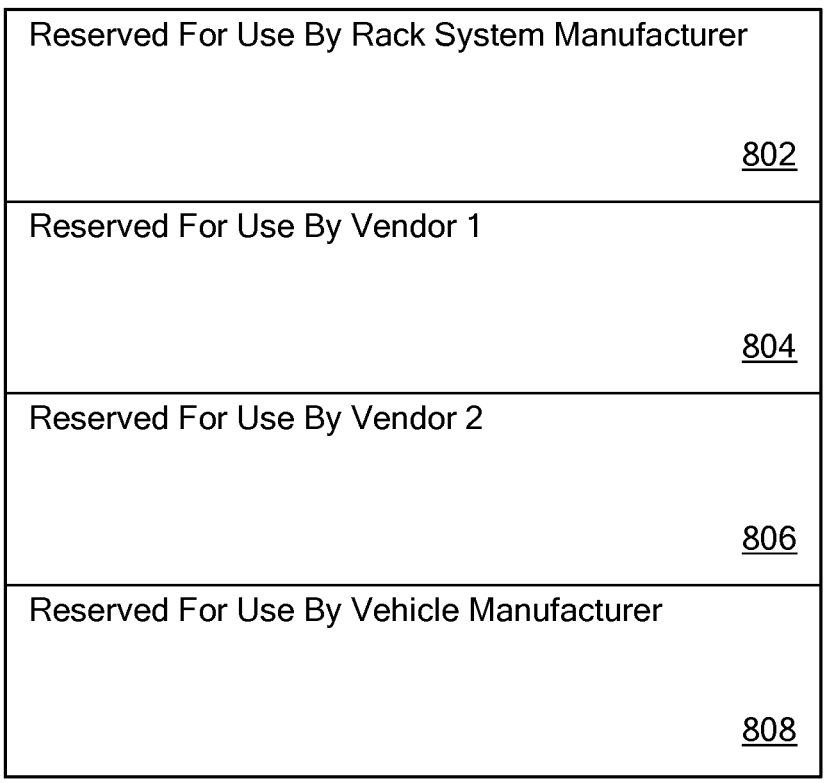
FIG. 8 is a block diagram of a memory in accordance with an embodiment of the present invention.

In another embodiment of the present invention, information in the vehicle memory, i.e., the TIM, is grouped to provide additional functionality. As shown in FIG. 8, the memory 800 is divided into a plurality of sections or blocks of memory addresses that are accessed by different users and/or for different functions. A first memory portion 802 is reserved for the rack manufacturer to place specific information. A second and third memory portions 804, 806 can be used by specific vendors that may have enough volume, in terms of devices or vehicles in the field, to require their own dedicated areas in the memory 800. Of course, the number and size of these memory portions can be adjusted or set as is known to one of ordinary skill in the art. A vehicle maker memory portion 808 can be dedicated to information placed by the vehicle manufacturer.

Referring now to FIG. 9, the vehicle maker memory portion 808 can have a number of fields that contain information regarding a specific vehicle. These fields are described below Initialize Vehicle Table This memory address is used to reset and confirm resetting of all locations in the defined vehicle builder area to zero.

Builder Table Revision

This location reports the revision of the vehicle builder table. The revision may be used by rack software to determine structure of the vehicle builder table in the event it differs from one revision to the next.

Valid Tester T.I.M. Serial Number

This location indicates if the tester T.I.M. is valid or not.

Tester T.I.M. Serial Number

This number is used to test the pin 9 interface from the vehicle to the rack system using a vehicle tester.

Valid Alternative T.I.M. Serial Number

This location indicates that the vehicle builder wants the rack system to use the Alternative T.I.M. serial number for verification instead of the factory-lasered serial number that comes with a memory chip.

Alternate T.I.M. Serial Number

The rack system should use this alternate T.I.M. serial number for the verification instead of the factory-lasered serial number that comes with the memory chip.

Builder Name

This field stores the ASCII string containing the name of the vehicle builder.

Builder Address

This field stores the ASCII string containing the vehicle builder's address.

Serial Number

A place to store a serial number if desired

Vehicle VIN number

Store the vehicle's VIN here.

Build date

This is a field that should accommodate a user-defined date in numbers. It could be day-month-year or year-day-month.

GVW unit

This indicates that the number stored in Gross Vehicle Weight (GVW) is in pounds or kilograms. A 1—pounds, 2—kilograms.

GVW

This is where the Gross Vehicle Weight (GVW) rating is stored

IntelliCheck Present

This field indicates if an IntelliCheck™ system from Scully Signal Corp. is present and its version. A zero is no IntelliCheck. 1 is version 1, 2 is version 2, 3 is version 3.

Sensor Type

Here is where the sensor type is stored. 1-thermistor, 2-2 write optical, 3-5 wire probe.

Number of Compartments

The number of compartments is stored here, 1 through 16. If the sensors are 5 wire and not connected to an IntelliCheck system, the rack could count the number of sensors and verify that it agrees with the number stored here. The rack can also verify the number two wire sensors jumper in the Intellitrol match this number.

Compartment Units

The respective volume of each compartment in the vehicle is stored in the next section of memory. This byte indicates the unit the number represents. 1-Gallons, 2-Imperial Gallon, or 3-Liters.

Volumes of Compartments 1 through 16

This area keeps the volume in units defined by the compartment units byte. The rack can use this information to determine if a vehicle driver is trying to fill a vehicle with more product than a compartment's capacity.

As shown above, in addition to the traditional truck Identification, this memory structure 808 allows a vehicle manufacturer to program an alternate TID.

When a vehicle connects to a controller, the controller inspects the memory, and based on its contents, uses either the unique TID or the alternate TID.

Advantageously, the alternate TID allows a user to not have to go to every loading rack and program the new TID of a vehicle. In one embodiment, the alternate TID allows the implementation of a scheme where the alternate TID is used to denote fuel type, fleet or customer information for a plurality of vehicles, each with its own unique TID. A customer using the alternate TID as a fuel identifier can change the fuel type for a vehicle by changing the alternate TID to the appropriate one for the new fuel.

Embodiments of the present invention may be used in conjunction with an Intellitrol Control System or the Scully Cenelec T.I.M. available from Scully Signal Company, Wilmington, Mass. In addition, embodiments of the memory can be implemented in either a DS2401 or a DS1996 chip available from Maxim-Dallas. Further, the memory as described above may be accessed through Modbus commands and protocols.

While embodiments of the present invention have been shown and described, it will be recognized by those skilled in the art that various changes in form and detail may be made herein without departing from the spirit and scope of the invention as defined by the appended claims.

What is claimed is:

1. A fluid overfill detection and control system for controlling the transfer of fluid into a transport vehicle having multiple fluid compartments, the system comprising:
    a plurality of overfill sensors, wherein each sensor is associated with a respective fluid compartment and produces a respective output pulse in response to a respective input pulse when a detected fluid level in the respective compartment is below a threshold level, and which does not produce the respective output pulse when the fluid level in the respective compartment has reached or exceeded the threshold level, and wherein the overfill sensors are arranged in series with one another such that the output pulse of one overfill sensor is provided as the input pulse to a next overfill sensor;
    a controller that regulates the transfer of fluid into the transport vehicle and that provides an initial input pulse to a first overfill sensor in the series of overfill sensors and receives a last output pulse from a last overfill sensor in the series of overfill sensors, and that inhibits the transfer of fluid into the vehicle if the last output pulse is not received;
    a diagnostic line connected to each of the overfill sensors, the diagnostic line providing a diagnostic signal to the controller indicative of a number of the overfill sensors that generate a respective output pulse; and
    a sensor count signal source that provides a sensor count signal to the controller indicative of a total number of overfill sensors located in the vehicle, the controller comparing the sensor count signal to the diagnostic signal and inhibiting the transfer of fluid into the vehicle if the number of overfill sensors indicated by the diagnostic signal does not match the number of overfill sensors indicated by the sensor count signal,
    wherein the diagnostic signal has an initial value, and
    wherein each overfill sensor is configured to modify the diagnostic signal from the initial value by a predetermined amount when producing the respective output pulse.

2. The fluid overfill detection and control system of claim 1 wherein the controller is located at a fluid loading terminal.

3. The fluid overfill detection and control system of claim 2 wherein the lookup table is located at the fluid loading terminal.

4. The fluid overfill detection and control system of claim 1 wherein the diagnostic signal comprises a diagnostic voltage and wherein the system further comprises a voltage lookup table module accessible by the controller that correlates the diagnostic voltage to a value indicative of a number of overfill sensors that are each providing an output pulse.

5. The fluid overfill detection and control system of claim 4 wherein the diagnostic voltage is at least partially formed by a set of parallel circuit paths each of which is created by a respective overfill sensor when that overfill sensor generates an output pulse.

6. The fluid overfill detection and control system of claim 1 further comprising a connection socket by which the overfill sensors are electrically connected to the controller.

7. The fluid overfill detection and control system of claim 1 wherein the sensor count signal source is located on the transport vehicle.

8. The fluid overfill detection and control system of claim 1 further comprising a compartment capacity signal source that, for each compartment of the transport vehicle, provides a capacity value indicative of a total maximum fluid capacity for that compartment.

9. The fluid overfill detection and control system of claim 8 wherein the compartment capacity signal source is located on the transport vehicle.

10. The fluid overfill detection and control system of claim 1 further comprising a compartment fuel type signal source that, for each compartment of the transport vehicle, provides a fuel type information indicative of a fuel type for its associated compartment.

11. The fluid overfill detection and control system of claim 10 wherein the compartment fuel type signal source is located on the transport vehicle.

12. The fluid overfill detection and control system of claim 1, further comprising:
    a non-volatile storage device comprising first and second identification information applicable to the transport vehicle,
    wherein the controller regulates the transfer of fluid into the transport vehicle as a function of the respective states of the active and dummy overfill sensors and the first and second identification information.

13. The system of claim 12, wherein:
    the first identification information comprises a unique serial number specific to the transport vehicle; and
    the second identification information comprises an identifier applicable to one or more transport vehicles.

14. The system of claim 13, wherein:
    the controller regulates the transfer of fluid in a first mode of operation as a function of the first identification information; and
    the controller regulates the transfer of fluid in a second mode of operation as a function of the second identification information.

15. A method of controlling the transfer of fluid into a transport vehicle having multiple fluid compartments and a plurality of overfill sensors each associated with a respective compartment and each producing a respective output pulse in response to a received input pulse when a detected fluid level in the respective compartment is below a threshold level, the overfill sensors being arranged in series with one another such that the output pulse of one is provided as the input pulse to a next overfill sensor in series, the method comprising:
    providing, with a controller that regulates the transfer of fluid into the vehicle, an initial input pulse to a first overfill sensor in the series of overfill sensors;
    monitoring, with the controller, for the presence of a last output pulse from a last overfill sensor in the series of overfill sensors and inhibiting the transfer of fluid into the vehicle if the last output pulse is not detected;
    receiving, with the controller, a diagnostic signal from a diagnostic line connected to each of the overfill sensors, the diagnostic signal being indicative of a number of overfill sensors that each generates an output pulse, wherein the diagnostic signal has an initial value;
    comparing, with the controller, the diagnostic signal to an overfill sensor count signal indicative of the total number of overfill sensors located in the vehicle;

inhibiting, with the controller, the transfer of fluid into the vehicle if the number of overfill sensors indicated by the diagnostic signal does not match the number of overfill sensors indicated by the overfill sensor count signal; and modifying, with each overfill sensor, the diagnostic signal from the initial value by a predetermined amount when producing the respective output pulse.

16. The method of claim 15 further comprising comparing a voltage level of the diagnostic signal to a value from a voltage lookup table module to determine a number of overfill sensors that are each providing an output pulse.

17. The method of claim 16 further comprising establishing a set of parallel circuit paths each of which is created by a respective overfill sensor when that overfill sensor is generating an output pulse, the diagnostic voltage being a function of the set of parallel circuit paths.

18. The method of claim 15 further comprising electrically connecting, with a connection socket, the overfill sensors to the controller.

19. The method of claim 15 further comprising providing a capacity value for each compartment with a compartment capacity signal source, the capacity value being indicative of a total maximum fluid capacity for its associated compartment.

20. The method of claim 15 further comprising providing a fuel type identifier for each compartment with a fuel type signal source, the fuel type identifier being indicative of a fuel type for its associated compartment.

21. A system for controlling the transfer of fluid into a transport vehicle having a plurality of compartments, the system comprising:
   a plurality of active overfill sensors, each active overfill sensor associated with a respective compartment and configured to produce a respective output pulse, in response to a respective input pulse, only when a detected fluid level in its associated compartment is below a threshold level;
   a number of dummy overfill sensors, each dummy overfill sensor configured to produce a respective output pulse in response to a respective input pulse, wherein a total number of dummy overfill sensors and overfill sensors is a first predetermined number and wherein the dummy and overfill sensors are arranged in series with one another such that the output pulse of one sensor is provided as the input pulse to a next sensor;
   a diagnostic line connected to each of the active and dummy overfill sensors, the diagnostic line configured to provide a diagnostic signal indicative of a number of active and dummy overfill sensors that each generates an output pulse, wherein the diagnostic signal has an initial value;
   wherein each active and dummy overfill sensor is configured to modify the diagnostic signal from the initial value by a predetermined amount when producing the respective output pulse; and
   a controller configured to regulate transfer of fluid into the transport vehicle, the controller further configured to:
      retrieve an expected value representing an expected total number of active and dummy overfill sensors and dummy overfill sensors to be detected on the vehicle;
      provide an initial input pulse to a first sensor in the series of sensors on the vehicle;
      detect the presence or absence of a last output pulse from a last overfill sensor in the series, in response to the initial input pulse;
      detect a value of the diagnostic signal on the diagnostic line;
      determine if the detected value of the diagnostic signal corresponds to the expected total number of active and dummy overfill sensors; and
      prevent the transfer of fluid into the vehicle if:
         the detected diagnostic signal value does not correspond to the expected total number; or
         the last output pulse was not detected.

22. The system of claim 21, wherein said controller is further configured to:
   retrieve the expected value of active and dummy overfill sensors from a non-volatile storage device located on the vehicle.

* * * * *